March 7, 1967   E. J. HOBART   3,308,265
FILTERING CIRCUIT
Filed Oct. 29, 1962
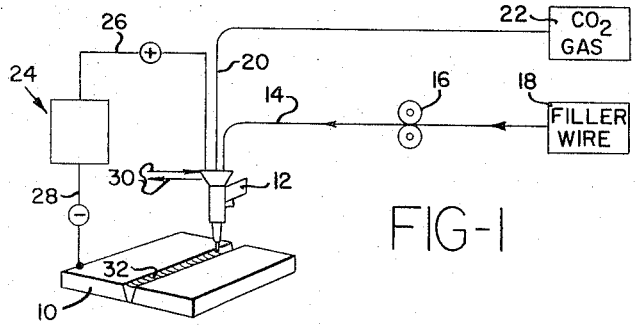
FIG-1
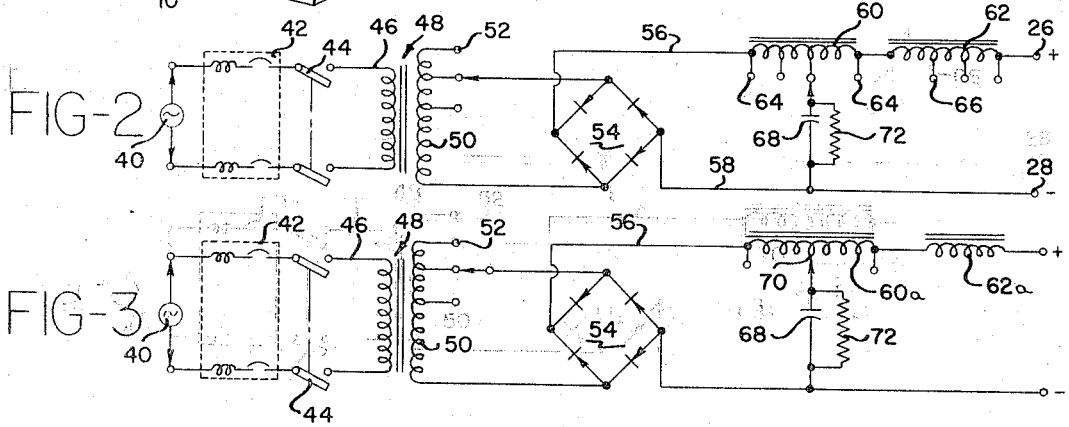
FIG-2
FIG-3
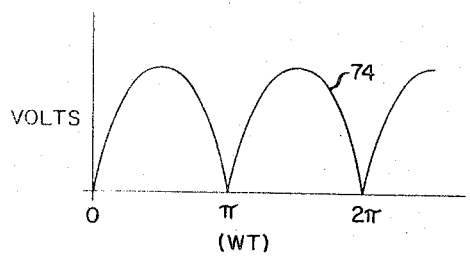
FIG-4
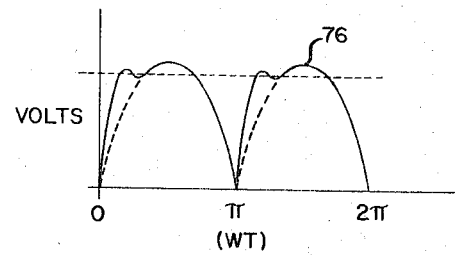
FIG-5
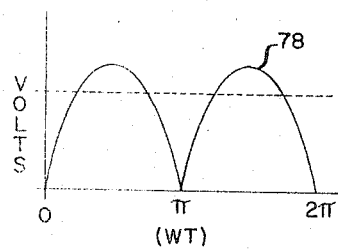
FIG-6
FIG-7
INVENTOR.
EDWARD J. HOBART
BY Toulmin & Toulmin
ATTORNEYS

United States Patent Office

3,308,265
Patented Mar. 7, 1967

3,308,265
FILTERING CIRCUIT
Edward J. Hobart, Troy, Ohio, assignor to Hobart Brothers Company, Troy, Ohio, a corporation of Ohio
Filed Oct. 29, 1962, Ser. No. 233,810
3 Claims. (Cl. 219—131)

This invention relates to welding and is particularly concerned with a method and apparatus for use in shorted arc transfer welding and more specifically still is concerned with a filter circuit employed in connection with a constant voltage single phase source of electrical energy for welding.

Shorted arc welding, also referred to as "short circuiting transfer" or, "dip transfer" is a welding technique which is employed utilizing current ranges that would result, if used for spray transfer of the welding material, in a rate of transfer or droplets from the welding wire to the work at too low a rate to permit satisfactory welding. The shorted arc transfer welding technique is thus employed for welding thin sheets which otherwise might burn through, and for welding in positions, such as vertical or overhead positions where the molten pool at the work is difficult to control.

In the shorted arc transfer technique of welding, it is customary to employ a bare wire and to mask or blanket the weld region with shielding gas, e.g. carbon dioxide or argon. In forming a weld by the shorted arc technique, the wire periodically engages the pool at the work and forms a short circuit. This results in an extremely rapid rise of current through the welding wire which produces heat and which causes melting of the wire at the pool and re-establishment of the arc with a simultaneous transfer of metal from the wire to the pool.

The technique of welding in this manner thus involves the repeated shorting of the welding wire and the interruption of the short and re-establishment of the arc. The rate at which the current rises when the short is effected is critical in order to obtain the best weld and to provide for stable welding conditions.

The rate of current rise must be sufficient to melt the welding wire rapidly but must not be so great as to cause an explosive condition in the weld region which would produce spattering of weld material and also produce an inferior weld. It is in particular connection with the control of the rate at which the current rises at the instant the wire short circuits on the work that the present invention is concerned.

With the foregoing in mind, it will be evident that a primary object of the present invention is the provision of an improved method pertaining to the shortened arc transfer welding technique.

Another object of this invention is the provision of improved apparatus, namely, a welding circuit, for the practice of the shorted arc transfer technique which results in more stable conditions and which produces better welding results.

Still further objects of the present invention will become more apparent with reference to the following specifications taken in connection with the accompanying drawings in which:

FIGURE 1 is a more or less diagrammatic view showing a typical welding setup for the practice of the shorted arc transfer technique or method of welding.

FIGURE 2 is a rather diagrammatic representation of the electric circuit according to my invention for supplying electrical energy to the weld region.

FIGURE 3 is like FIGURE 2 but shows a somewhat modified arrangement of the circuit.

FIGURE 4 is a graph showing the rectified output voltage as it appears with the filter portion of the circuit adjusted to form a balanced T connection.

FIGURE 5 is a view similar to FIGURE 4 but shows how the induced voltage components in the filter tend to distort the voltage in the rectifier output causing the average D.C. voltage to be increased.

FIGURE 6 is a view like FIGURE 5 but shows how the distortion changes with a change of output current and actually decreases with increasing load current.

FIGURE 7 is a graph showing how the use of the unbalanced T filter according to the present invention results in a relatively high open circuit voltage with a preliminary dropping voltage characteristic at low currents and a relatively flat voltage characteristic at higher currents.

According to the present invention, a single phase alternating current source of electrical energy is connected through a full wave rectifier, then passes through a filter to the weld region, the negative side of the line being connected to the work and the positive side to the welding wire. A supply of this nature to the weld region is filtered to reduce the ripple in the welding current while simultaneously the filter should provide the necessary reactance in the circuit to provide for the desired rate of increase of the welding current at the instant that the welding arc is short-circuited.

Heretofore, L type filters have been employed consisting of an inductance coil and a capacitor connected across the line between the inductance coil and the rectifiers. An arrangement of this nature produces some filtering effect and also introduces some inductive reactance into the circuit, but has definite defects with respect to the best control of the welding current for the shorted arc transfer welding process.

According to the present invention, the supply of welding current and the voltage to the arc region is controlled in a greatly improved and highly flexible manner by employing, instead of the customary L filter, a T filter, preferably with multiple taps so that the T filter can be adjusted to meet the particular welding conditions being encountered. The welding conditions, will, of course, vary with welding wire sizes and with the thickness of the work being welded, and will also vary in accordance with the shielded gas employed and the particular material being welded. No simple combination of a choke coil and a capacitor, namely an L section filter, will effect control of the voltage and current at the arc that will satisfactorily meet the several varying conditions referred to. In addition, an L section filter with the capacitor located between the choke coil and the rectifiers tends to subject the rectifiers to the maximum in peak currents which is an undesirable condition for the rectifiers.

In the drawings, there is shown the improved circuitry of the present invention in which the drawbacks of L section filters are eliminated, and by means of which improved welding results can be had and which enables adjustment of the welding circuit to meet the particular welding conditions being encountered.

In FIGURE 1, the work being welded is indicated at 10 and welding gun is indicated at 12. The welding wire 14 is fed through the gun by wire feeding means represented by feed rollers 16 from a source 18 of the wire which is usually a roll or reel of the wire.

Gun 12 has means for supplying a shielding gas, such as carbon dioxide, to the weld region by way of conduit 20 from a source 22.

The source of welding current is indicated generally at 24 and it comprises a positive terminal 26 connected through the gun with wire 14 and a negative terminal 28 that is connected with work 10. The gun may also have conduit means 30 by means of which cooling fluid is circulated through the gun.

As has been explained, the laying down of the weld line as indicated at 32 is accomplished by feeding wire through the gun to the work while passing welding current from the wire to the work, and with the shorted arc transfer process, this current flow is relatively low so that the wire periodically shorts against the work and at which time the current rises in the wire whereby there is a transfer of a globule of molten wire to the work, thereby re-establishing the arc whereupon, after a short time, another short will occur. It is critical in this arrangement that the rate of increase of the current in the wire be regulated to produce stable conditions. With small wire sizes the rate of increase of current will be greater than for large wire sizes because with small wire the short circuit lasts a much shorter time than it does with large wires. The actual current arrived at during the short circuiting is greater with the large wire than it is with the small wire, but, on account of the times involved, the rate of increase of the current with the small wire is greater than it is with the large wire.

The current source indicated generally at 24 in FIGURE 1 is shown more in detail in FIGURE 2 where it will be seen that there is a source of alternating current at 40 the terminals of which are connected through the overload relay means 42 and switch means 44 with the primary side 46 of a transformer 48. The secondary side of the transformer at 50 has taps 52 and the output terminals of the secondary are connected to the input terminals of a full wave rectifier bridge 54. The rectifier bridge 54 has output terminals connected with the positive wire 56 and the negative wire 58. In one of these wires, the positive wire for example, are the inductors 60 and 62, each having an iron core, and with the inductors having the multiple taps 64 and 66, respectively. Arranged between lines 56 and 58 is a branch having a capacitor 68 and which branch can be connected to any of the aforementioned taps 64, 66 in order to produce whatever type filtering action is desired. For example, if the branch is connected to the extreme left tap 64 the result will be more or less L section filter, whereas if the branch is connected to the tap 64 at the extreme right end of inductor 60, a substantially balanced T section filter will be had. This last comment obtains where the inductors 60 and 62 are identical although it will be understood that these could vary as to their individual characteristics, if so desired.

The T filter arrangement illustrated provides the necessary internal inductance in the power supply to the arc to obtain the proper time constants essential for achieving certain welding results.

The T filter also provides the filtering needed to decrease the ripple voltage of the power supply as is well understood in connection with filter sections of various types.

The particular T filter section illustrated and described has the distinct advantage that the time constant of the circuit is adjustable by changing the point at which the branch containing the filter capacitor 68 makes connection with the inductors. Thus, by employing a tap switch, the T filter section as illustrated can be "tuned" to any specific operating conditions.

Wherever the connection of the capacitor branch to the filter choke is intermediate the ends of the pertinent choke, there is a feedback characteristic through the magnetic material of the pertaining inductor which tends to stabilize the arc. This is a feature of the present invention that becomes apparent when the capacitor branch is connected in positions other than that which will produce a balanced T section filter or an L section filter.

The T section illustrated has merit in that the surge currents on the diodes of the rectifier bridge is considerably less than are encountered in the circuit containing an L section filter. The two inductors of the T filter section arranged as illustrated also result in considerably reduced ripple voltages as compared with the single inductor that is employed in the conventional L section filter. It will be appreciated that the location of a portion of the inductance of the circuit between the filter capacitor and the rectifier bridge is effective for reducing the peak current surges referred to above to which the rectifiers are subjected, while at the same time, the capacitor is an energy storage device and acts as a source of energy during the welding operation.

The circuit of FIGURE 3 is substantially identical with that of FIGURE 2 and carries the same numbers except that in FIGURE 3 the inductor 60a which corresponds to inductor 60 in FIGURE 2 has a slide wire connection in the form of a brush or the like at 70 which permits extremely fine adjustments at the point of connection of the capacitor branch. In FIGURE 3 inductor 62a, which corresponds to inductor 62 of FIGURE 2 has no taps thereon. In both figures capacitor 68 is preferably bypassed by a discharge resistor 72, which, however, has no effect on the operation of the circuit except to discharge the filter capacitor under certain conditions.

In the operation of either of the circuits, closing of the switch 44 will cause a voltage to be established in the secondary side of transformer 48. This voltage is rectified by bridge 54 and the output from this bridge will charge the filter capacitor 68 through the portion of the pertaining inductor located between the capacitor and the rectifier bridge.

The inductor thus reduces the peak current to which the diodes are subjected when switch 44 is closed and there is no load at the terminals of the welding circuit. The capacitor 68 however will charge up to a voltage which is only slightly less than the peak voltage of the rectified secondary voltage.

If the output terminals of the filter are now connected to a load, the output current will commence to flow through the terminals and in particular, will pass through the portion of the inductor between the capacitor branch and the terminals. This portion of the capacitor branch will prevent certain current surges through the welding electrode at the arc and will, in fact, permit the welding current to rise only at the desired rate depending upon the setting of the capacitor branch and the selection of the inductors.

By way of explanation of the manner in which the circuit according to the present invention operates, FIGURE 4 shows by the graph 74 that with a balanced T filter section, the rectifier output voltage appears as the normal undistorted full wave rectifier voltage.

With the filter adjusted to form an unbalanced T section filter, the induced voltages in the tapped inductor tend to distort the voltage at the rectifier output, thus causing the average direct current voltage to be increased. This is illustrated in FIGURE 5 by the graph represented by the line 76. In this particular graph the average voltage is 35.8 volts and the current flow is 25 amp.

This distortion is a function of output current on account of the feedback characteristics of the tapped inductor and the distortion in the particular case illustrated actually decreases the increased load. This is illustrated by graph 78 in FIGURE 6 wherein the average direct current voltage is 30½ volts and the current flowing is 50 amp. with the circuit connections and the other conditions being the same as the conditions with respect to the graph of FIGURE 5.

By using the T filter section in unbalanced connection, a relatively high open circuit voltage is obtained with the voltage at the terminals dropping rapidly at low currents and the tending to flatten out as the current increases. The conditions referred to are represented by line 80 in the graph of FIGURE 7. The relatively high open circuit voltage assists in re-establishing the arc as the electrode burns off while the flat voltage characteristics at the high current values tend to produce the stable conditions in the welding region that have been referred to above.

It will be understood that this invention is susceptible to modifications in order to adapt it to different usages and conditions; and accordingly, it is desired to comprehend such modifications within this invention as may fall within the scope of the appended claims.

What is claimed is:
1. A power supply for use in shorted arc transfer welding wherein a consumable electrode is shorted periodically to cause heating and melting thereof with the molten electrode metal sprayed onto the work when an arc between the electrode and work is established, said power supply comprising:
  a source of alternating current at substantially the welding voltage;
  rectifier means for converting said alternating current to direct current;
  output terminal means for connection with the article to be welded and to a consumable welding electrode; and
  filter means to reduce the ripple in the output wave form, to protect the rectifier means from the peak currents resulting when the electrode is shorted against the workpiece, and to control the rate of current rise through the electrode, said filter interconnecting said output terminals with said rectifier means and including:
  a first and second iron core inductor connected in series between said rectifier means and one of said output terminals, said first inductor connected adjacent said rectifier means and having an adjustable connection thereon; and
  a capacitor having one side connected to the other of said output terminals and the other side connected to the adjustable connection on said first inductor, said filter means providing a high open circuit voltage to assist in the reestablishment of the arc after melting the electrode to assist in metal transfer and to provide a lower, substantially constant voltage at the output terminals as the current subsequently increases when shorting is again effected, the positioning of said adjustable connection determining the time constant of the filter and being so adjusted that the rate of current rise occurring when the electrode shorts against the workpiece causes the rapid but controlled melting of the electrode and the reestablishment of an arc with the simultaneous transfer of a spray of metal from the electrode to the workpiece without causing splatter of the weld material.

2. The power supply defined in claim 1 wherein the adjustable connection on said first iron core inductor is a plurality of taps and wherein said capacitor is adapted to be connected to any one of said taps in order to provide the desired time constant of the filter and thereby determine the rate of current rise in the electrode during shorting of the electrode with the workpiece.

3. The power supply defined in claim 1 wherein the adjustable connection on the first iron core inductor is a slide wire connection in the form of a brush which contacts the inductor providing fine adjustments of the point of connection with said capacitor thereby to adjust the time constant of the filter and control the rate of current rise in the electrode during shorting of the electrode with the workpiece.

References Cited by the Examiner
UNITED STATES PATENTS

| | | | |
|---|---|---|---|
| 1,920,948 | 8/1933 | Grouse | 321—10 |
| 2,413,033 | 12/1946 | Potter | 321—10 |
| 3,136,884 | 7/1964 | Glenn et al. | 219—131 |
| 3,231,711 | 1/1966 | Gibson et al. | 219—131 |
| 3,246,229 | 3/1966 | Lloyd | 321—16 X |

JOSEPH V. TRUHE, *Primary Examiner.*